Feb. 19, 1952
A. W. MALL
2,586,360
FLEXIBLE SHAFT COUPLING
Filed June 6, 1947
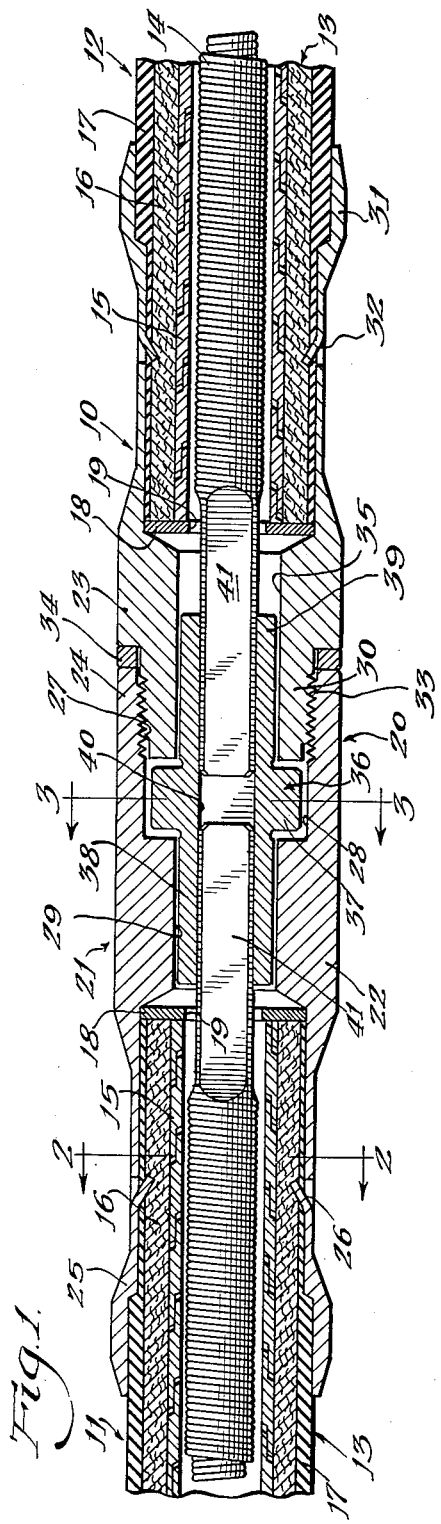
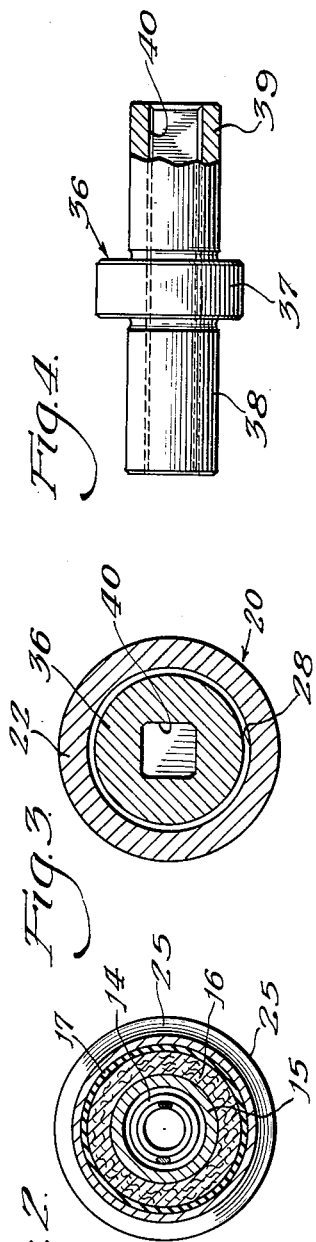
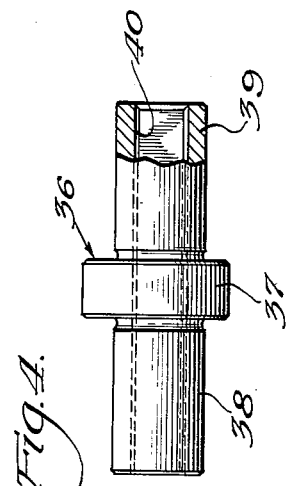
Inventor:
Arthur W. Mall
By: Zabel & Fritzlaugh
Attorneys Patented Feb. 19, 1952

2,586,360

UNITED STATES PATENT OFFICE 2,586,360

FLEXIBLE SHAFT COUPLING

Arthur W. Mall, Flossmoor, Ill., assignor to Mall Tool Company, Chicago, Ill., a corporation of Illinois Application June 6, 1947, Serial No. 752,948

1 Claim. (Cl. 64—4)

The present invention relates to flexible shafts and particularly to a coupling arrangement for joining together two lengths of flexible shafts.

The coupling portion for flexible shafts is necessarily rigid and, therefore, when used in a shaft detracts from the total flexibility of the shaft. In other words, a flexible shaft ideally should be flexible throughout its entire length but when couplings are used to join shaft lengths together these coupling portions constitute rigid regions in the otherwise flexible shaft. These regions of rigidity are undesirable.

An object of the present invention is to reduce to a minimum the lengths of the rigid portions of a flexible shaft when couplings are required. It is also an object of the invention to simplify the cost of couplings for use in joining lengths of flexible shafts, while at the same time it is intended to provide an effective coupling that maintains both lengths of shaft in alignment so as to reduce wear in the housing to a minimum.

The foregoing constitute some of the principal objects of the present invention, others of which will become apparent from the following description and the drawings, in which Fig. 1 is a longitudinal sectional view through two fragments of flexible shaft lengths showing the coupling arrangement embodying the present invention;

Fig. 2 is a transverse sectional view through one shaft, the view being taken on the line 2—2 of Fig. 1;

Fig. 3 is a transverse sectional view through the center of the coupling, the view being taken on the line 3—3 of Fig. 1; and Fig. 4 is a plan view of the core piece of the coupling shown in Fig. 1.

For purposes of illustration one embodiment of the present invention will be described herein, though it is recognized that numerous variations may be made in the embodiment to be described without departing from the intended scope of the invention.

Referring to the drawings, the invention is illustrated in relationship to a flexible shaft generally indicated at 10. This shaft 10 is made up of two or more shaft lengths indicated generally at 11 and 12. Each shaft length 11 or 12 comprises an outer casing generally indicated at 13 in Fig. 1 which houses a flexible shaft core 14. This core 14 is adapted to rotate inside the casing 13.

The casing 13 includes an inner liner 15 surrounded by a sheath 16, the latter of which is encased in a rubber hose or the like 17. A closure member 18 is fastened to the end of the shaft casing 13 and this closure member is apertured at 19 so that the end of the shaft core 14 may pass therethrough. As previously mentioned both shaft lengths 11 and 12 are identical as shown in Fig. 1.

The coupling member for joining together the shaft lengths 11 and 12 is generally indicated at 20 in Fig. 1. This coupling member 20 includes a coupling housing generally indicated at 21 made up of two housing portions 22 and 23. The housing portion 22 is provided with a female coupling member 24 at one end thereof and is further provided with a shaft engaging portion 25 at the opposite end thereof. This shaft engaging portion 25 is adapted to receive the end of the shaft length 11 as indicated and is adapted to grip the casing 13 as indicated at 26.

The female coupling portion 24 is threaded as at 27 and behind this threaded portion there is provided a chamber 28. The housing portion 22 is further provided with a passage 29 that extends longitudinally through the housing portion and communicates with the chamber 28.

The housing portion 23 is provided at one end with a male coupling portion 30 and at the opposite end with a shaft engaging portion 31 that corresponds with the previously mentioned shaft engaging portion 25. This shaft engaging portion 31 is fixed or clamped to the casing 13 of shaft lengths 17 as indicated at 32. The male coupling portion 30 is threaded as at 33 so that the male coupling portion 30 may be threaded into the female coupling portion 24. A ring gasket 34 is disposed between the housing members 22 and 23 when the two are coupled together as shown in Fig. 1.

The free end of the male coupling portion 30 of housing member 23 forms a wall of the chamber 28 in the housing member 22. The housing member 23 is provided with a longitudinal passage 35 disposed therethrough.

A coupling core piece 36 is adapted to reside in the coupling housing 21 and is provided with a central locking portion 37 that is disposed in the chamber 28 and is further provided with oppositely disposed projecting portions 38 and 39 that reside in the passages 29 and 35 respectively of housing members 22 and 23. The coupling core piece 36 is adapted to rotate in the housing 21. The core piece 36 is provided with a passage 40 that extends longitudinally throughout the length thereof and as best shown in Fig. 3 this passage 40 is rectangular or square in cross section.

Each shaft core 14 of flexible shaft lengths 11 or 12 is provided with an elongated coupling engaging portion 41 that is rectangular or square in cross section so as to conform with the cross section of the passage 40 in the coupling core piece 36. Thus as shown in Fig. 1 these portions 41 of the shaft cores 14 project into the passage 40 of the core piece 36.

Thus there is provided a pair of flexible shaft lengths 11 and 12 that are effectively and simply coupled together by means of the shaft coupling member 20. As one of the shaft cores 14 is rotated by some suitable power means (not shown) this rotary motion is transmitted to the other shaft core through the coupling core piece 36, this coupling core piece 36 being adapted to rotate in the coupling housing 21.

The overall length of the coupling member 20 is reduced to a minimum by the arrangement just described and therefore a flexible shaft made up of a plurality of shaft lengths 11 and 12 coupled together by means of the coupling members 20 possesses maximum flexibility.

I claim:

In combination a pair of flexible shafts having rotatable shaft cores and outer casings, a tubular housing member secured to said outer casings of each flexible shaft, means for connecting said tubular housing members in axial alignment, the inner walls of said housing members defining a longitudinal passage, means in said housing members defining an annular chamber of greater diameter than said passage, and a coupling in said passage having a cylindrical body portion rotatably journalled directly on the inner walls of said tubular housing members, and a locking portion of enlarged diameter disposed in said enlarged chamber, said coupling having sockets at each end, the ends of the flexible shaft cores being removably disposed in said sockets.

ARTHUR W. MALL.

REFERENCES CITED

The following references are of record in the file of this patent:

UNITED STATES PATENTS

| Number | Name | Date |
|---|---|---|
| 1,433,537 | Elliott | Oct. 31, 1922 |
| 1,649,310 | Joline | Nov. 15, 1927 |
| 1,871,528 | Joline | Aug. 16, 1932 |
| 2,222,613 | Green | Nov. 26, 1940 |
| 2,243,960 | Hotchkiss, Jr. | June 3, 1941 |

FOREIGN PATENTS

| Number | Country | Date |
|---|---|---|
| 407,913 | Germany | 1925 |
| 752,264 | France | 1933 |